J. R. BRIGGS.
ANIMAL TRAP.
APPLICATION FILED JUNE 25, 1909.
964,488.
Patented July 19, 1910.
2 SHEETS—SHEET 1.
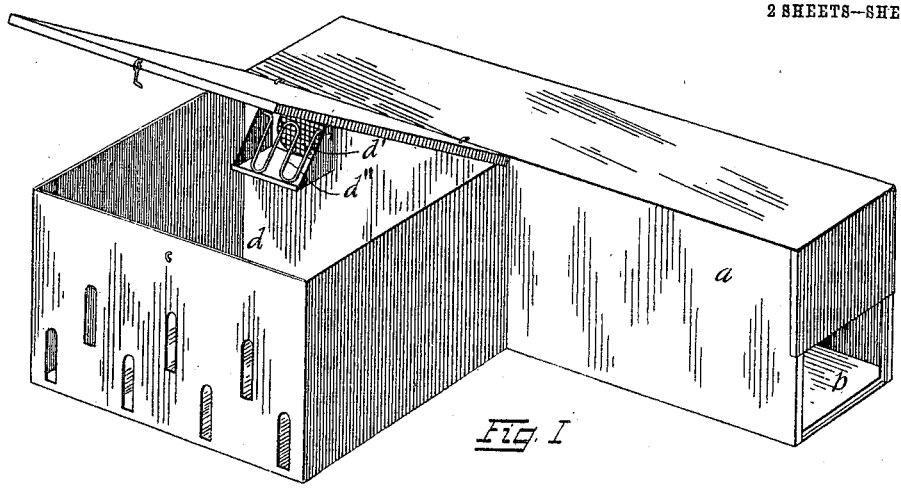
Fig. I.
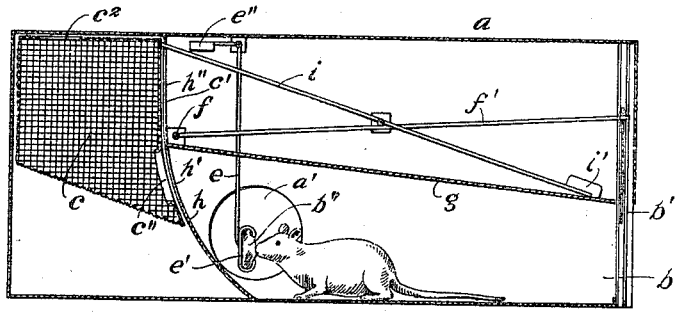
Fig. II.
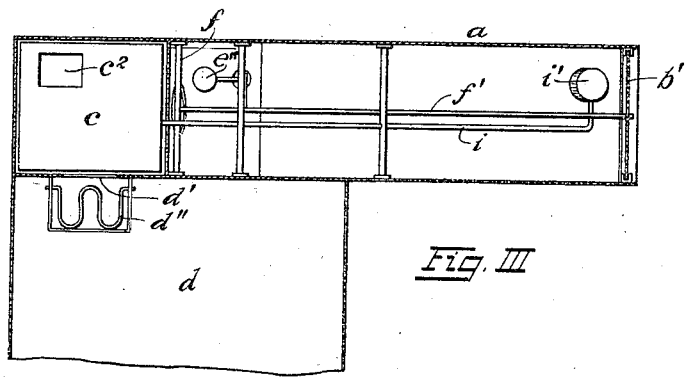
Fig. III.
Witnesses:
F. C. Valentine
Frank H. Forrest
Inventor:
Julius Rawson Briggs.
by his Attorney.
THE NORRIS PETERS CO., WASHINGTON, D. C.

J. R. BRIGGS.
ANIMAL TRAP.
APPLICATION FILED JUNE 25, 1909.
964,488.
Patented July 19, 1910.
2 SHEETS—SHEET 2.
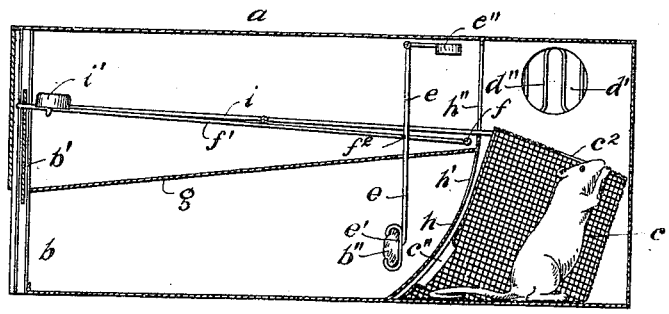
Fig. IV.
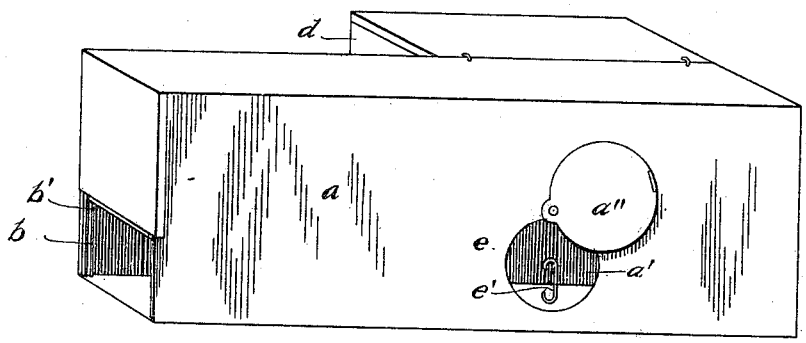
Fig. V.
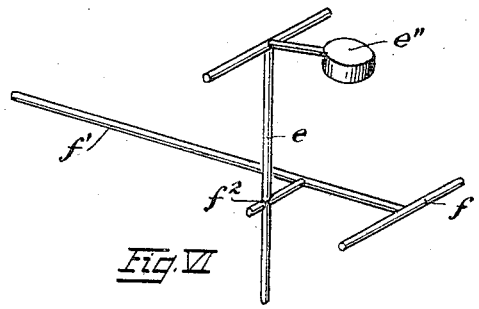
Fig. VI.
Witnesses:
F. C. Valentine
Frank N. Forrest
Inventor:
Julius Rawson Briggs,
By Albert ＿＿＿＿
his attorney.
THE NORRIS PETERS CO., WASHINGTON, D. C.

UNITED STATES PATENT OFFICE.

JULIUS RAWSON BRIGGS, OF UPLAND, CALIFORNIA.

ANIMAL-TRAP.

964,488.  Specification of Letters Patent.  Patented July 19, 1910.

Application filed June 25, 1909. Serial No. 504,317.

*To all whom it may concern:*

Be it known that I, JULIUS RAWSON BRIGGS, a citizen of the United States of America, and a resident of Upland, in the county of San Bernardino and State of California, have invented certain new and useful Improvements in Animal-Traps, of which the following is a specification.

My invention relates to improvements in animal traps, and the embodiment thereof which I herein disclose is a self-setting trap adapted for catching rats or mice.

My improved trap is designed so that it may be constructed in a simple manner from tinned or galvanized sheet metal and wire, so that it may be readily cleansed and disinfected to avoid odors likely to frighten away the rodents. As thus constructed, the trap is not liable to rust and may be immersed in water for the purpose of drowning the animals. Moreover, the actuating parts are so designed as to make the automatic resetting of the trap absolutely certain, and they are positioned to avoid any interference on the part of the rats or mice.

Referring first to my improved trap in a preliminary way, I may say that it comprises an entrance passage wherein the bait alone is freely displayed, an automatically closed door for preventing the escape of the rodent, a resetting cage wherein and upon which the animal must climb thus reopening the door, and a retaining chamber or cage separate from the other compartments, wherein the rodents remain until they are destroyed. These, with other features of my improvements, are pointed out in the specification and claims, and will be more readily understood by making reference to the accompanying drawings, wherein:—

Figure I is a perspective view of the entire device showing the lid of the retaining chamber open. Fig. II is a longitudinal sectional view of the entrance passage and resetting cage. Fig. III is a transverse sectional view of the trap. Fig. IV is a longitudinal sectional view of the entrance passage and resetting cage with the latter in its resetting position and the rodents about to escape therefrom. Fig. V is a perspective view of the trap from the side opposite that of Fig. I, showing the opening for inserting the bait. Fig. VI is a detail illustrating a portion of the actuating mechanism.

Throughout the several figures of the drawings I have employed the same character of reference to indicate similar parts, in order that confusion may be avoided in referring thereto.

The body of the trap, as will be seen by referring particularly to Figs. I and V, is generally L-shaped in plan view, the longer portion $a$, comprising the entrance passage $b$, and the resetting trap $c$, while the shorter portion is occupied by the retaining chamber $d$ for an indefinite number of the rodents. These are kept out of sight, however, so that while they may be heard and smelled by the rat or mouse entering and passing through the trap, and thus reassuring him, they cannot frighten him by viewing them caged up.

Passage $b$ normally is freely accessible beneath the sliding door $b'$, and at the end of the passage the bait $b''$ may be freely exposed to view. This is inserted through opening $a'$, which is normally covered by the pivoted closure $a''$, within the slide $e'$ carried at the end of the trigger $e$, which trigger is counterbalanced by a weight $e''$. The door $b'$ is normally held open by means of the rearwardly pivoted lever $f$ and its laterally extended arm $f'$, which respectively engage an opening formed near the top of the door, and a notch $f^2$ provided on the trigger. The relation of these members will be best understood by making reference to Figs. IV and VI.

A substantially horizontal partition $g$ of sheet metal through which the baited end of the trigger protrudes, serves to close off the passage from the actuating parts, and a curved partition $h$ closes the end of said passage, except for an opening $h'$, communicating with the resetting trap. The upper portion of said partition is slotted at $h''$.

Fig. II shows the normal position of the resetting trap $c$, which preferably is formed of wire netting, except for its inner partition wall $c'$; this being constructed of sheet metal, through which an opening $c''$ normally registering with the opening $h'$, permits the access of the rodent to said resetting trap. An additional opening $c^2$ permits the animal in turn to gain access to the top of the trap. This resetting trap $c$ is pivotally carried by the weighted lever $i$, journaled at about the central portion of the trap body $a$; said lever carrying at its opposite end a counterweight $i'$ designed normally to hold the resetting trap in its raised position.

The weighted end of said lever $i''$ is bent so that it crosses beneath the supporting lever $f$, as best shown in Fig. III.

The opening $d'$ closed by the gate $d''$, permits the access of the rodent to the retaining chamber $d$.

Having now explained the structural features of my improved trap, I may now advert to its operation and some of its advantages. The rat or mouse in passing by the trap, necessarily sees and smells the bait $b''$ at the end of passage $b$, and in consequence is attracted thereby to enter said passage and nibble at the bait. This, however, causes the trigger to release arm $f'$, and the door $b'$ falls of its own weight, which, of course, alarms the now imprisoned rodent, and seeking the only escape from passage $b$, he at once finds entrance through registering openings $h'$ $c''$ to the resetting cage $c$. The weight of the rodent, of course, counterbalances the weight $i'$, causing the cage to fall and the lever $f$ to be engaged by the outer end $i''$ of lever $i$, thereby raising the slide door $b'$ and resetting the trap, as indicated in Fig. IV.

If, by any chance, the trigger should not engage the arm $f'$, a few minutes later, the rodent upon gaining access to the top of the resetting cage and crawling through opening $d'$, will so actuate the parts as to insure the retention of the door in its raised position by means of lever $f$ and trigger $e$. It will be observed that inasmuch as the cage $c$ is formed of wire netting, except for the inner partition thereof, which is made of sheet metal, that the falling of the cage cuts off the access of light thereto through opening $h'$, and the rodent is immediately attracted by the light finding entrance through openings $d'$ $c^2$. This insures the prompt resetting of the trap.

Upon gaining access to the retaining chamber $d$, the rodent will be compelled to remain therein, until such time as he is discovered and destroyed, together with any others which have meantime passed through the trap and reset it as above described.

Having now explained the preferred construction of my improved animal trap and the mode of its operation, I claim as new and desire to secure by Letters Patent, together with such modifications as may be made by mere skill, the following:—

1. In an animal trap, the combination with a passageway, of a door for closing the same, trip mechanism for releasing the door, a resetting cage connected with said door, and a retaining chamber; the said resetting cage having openings communicating with the passageway and with the retaining chamber, and a counterweight for restoring the resetting cage, substantially as set forth.

2. In an animal trap, the combination with a sheet metal body portion, partitions therein subdividing it into a passageway for the animal, a chamber for the actuating parts, a communicating chamber for the resetting cage, and a retaining chamber opened to the light, of a door for closing said passageway, a pivoted resetting cage connected with the door, a counterweight for the cage, a trigger for normally retaining the door, and means for excluding the light rearwardly of the animal and for preventing its return from any of the compartments, substantially as set forth.

3. In an animal trap, the combination with a passageway substantially level with the part supporting the trap, of an outer closure therefor, trip-actuated means for releasing the closure, a pivoted resetting cage normally communicating with the passage, and connected to open the closure, a counterweight for said cage, a retaining chamber, and means for preventing the return of the animal from any of the several compartments it traverses, substantially as set forth.

4. In an animal trap, the combination with a sheet metal body portion, partitions therein subdividing it into a passageway for the animal substantially level with the supporting part, a chamber for the actuating parts, a communicating chamber for the resetting cage, and a retaining chamber open to the light, of a pivoted door for closing said passageway, trip-actuated means for retaining the door in an elevated position, a pivoted resetting cage connected with said door; said cage comprising inclosing walls of wire mesh and a sheet metal partition containing a single opening adjacent to the passageway, a counterweight for said cage, and means for preventing access of light rearwardly of the animal and for checking its return from any of the compartments, substantially as set forth.

Signed at Upland, California, this 16th day of June, A. D. 1909. in the presence of two subscribing witnesses.

JULIUS RAWSON BRIGGS. [L. S.]

Witnesses:
THOS. W. HARRIS,
W. B. STEWART.